US005209599A

United States Patent [19]

Kronenberg

[11] Patent Number: 5,209,599

[45] Date of Patent: May 11, 1993

[54] PLUG CONNECTOR FOR HOLLOW SPACER PROFILES OF INSULATING GLASS PANES

[75] Inventor: Max Kronenberg, Solingen, Fed. Rep. of Germany

[73] Assignee: Helmut Lingemann GmbH & Co., Wuppertal, Fed. Rep. of Germany

[21] Appl. No.: 654,225

[22] Filed: Feb. 12, 1991

[30] Foreign Application Priority Data

Jul. 21, 1990 [DE] Fed. Rep. of Germany ....... 9010884

[51] Int. Cl.[5] ........ F16B 2/20

[52] U.S. Cl. ........ 403/298; 403/297; 403/280; 403/292

[58] Field of Search ........ 403/298, 297, 295, 292, 403/280, 402

[56] References Cited

U.S. PATENT DOCUMENTS

| | | | |
|---|---|---|---|
| 2,850,304 | 9/1958 | Wagner | 403/297 X |
| 2,996,159 | 8/1961 | Casebolt | 403/280 |
| 3,214,802 | 11/1965 | Davis | 403/280 |
| 3,799,685 | 3/1974 | Smith et al. | 403/298 |
| 4,296,587 | 10/1981 | Berdan | 403/298 X |
| 4,570,408 | 2/1986 | Frascaroli et al. | 403/297 X |
| 4,683,634 | 8/1987 | Cole | 403/403 X |
| 5,022,777 | 6/1991 | Kolvites | 403/292 X |
| 5,048,997 | 9/1991 | Peterson | 403/295 |

*Primary Examiner*—Andrew V. Kundrat
*Assistant Examiner*—Harry C. Kim
*Attorney, Agent, or Firm*—Amster, Rothstein & Ebenstein

[57] ABSTRACT

A plug connector for making a connection joint between an axially aligned pair of hollow spacer profiles of insulating glass panes defines a longitudinal axis and a center transverse axis transverse thereto and is configured as an essentially box-type cross section with a center web and a pair of side webs extending from the center web. A plurality of essentially triangular openings are located in the center web on both sides of the center transverse axis, each of the openings defining an apex pointing to the nearest end of the plug connector. The plug connector is further configured as a stamped and bent component made from sheet steel with an essentially U-shaped cross section, with the openings in the center web being configured as wall perforations fully circumscribed by the center web, and with the side webs having a plurality of bent-out elastic retainer catches. Two of the elastic retainer catches are located immediately adjacent to one another on each web side in the region of a profile connection joint and pointing in opposite directions to form a stop for one of the profiles.

6 Claims, 4 Drawing Sheets

PLUG CONNECTOR FOR HOLLOW SPACER PROFILES OF INSULATING GLASS PANES

BACKGROUND OF THE INVENTION

The invention refers to an plug connector for hollow spacer profiles of insulating glass panes.

A plug connector of this type is known from EP 0 133 655. It is a casting, and has trough-shaped triangular openings in its center web. These are used for positive engagement with wall deformations in the hollow spacer profile. Being a casting made of plastic, zinc, or the like, such an plug connector is relatively expensive. Another unfavorable aspect is the increased material expense resulting from the high thickness of the center web, which is needed in order to shape the trough openings. In addition, because of its restricted depth and oblique walls, the trough shape does not allow optimum wall deformation of the hollow profiles, or optimum positive engagement. Another disadvantage is that the known plug connector has a projecting rib as the stop for the hollow profiles that are slid on, which spaces the connection points of the hollow profiles away from each other in an undesirable manner.

Additional plug connectors of conventional design are known in a variety of embodiments, for example from EP 283 689 or DE-OS 34 08 600. These plug connectors are retained in the hollow profiles only by clamping engagement by means of their retaining catches. This fastening capability is insufficient for many applications.

The object on which the invention is based is therefore that of indicating a more economical plug connector and plug connection, that offer a better fastening capability.

SUMMARY OF THE INVENTION

The plug connector according to the invention is produced from sheet steel as a stamped and bent component, and is therefore more favorable in terms of cost than a cast connector. In the plug connector according to the invention, the openings in the center web are configured as punched-out wall perforations. The top wall of a slid-on hollow profile can be deformed in these wall perforations, resulting in a positive connection with high retention force against undesired withdrawal of the plug connector from the hollow profile. As a variation on a wall deformation, the plug connection can also be secured by rivets or by other similar inserted retention elements.

The pass-through opening configured as a wall perforation has particular advantages in terms of secure fastening. On the one hand, a wall perforation can be stamped in the hollow profile to any desired depth, since it engages through the pass-through opening. It is therefore not limited as to depth, as is the case with the known trough-shaped opening. The wall deformation can also press on the entire surface through the pass-through opening, resulting in a system that is tight and secure on all sides, which increases joint reliability. The thin-walled center web of an plug connector configured as a stamped and bent component also has the advantage that it locks particularly well against any pulling-out movement of the plug connector, and in fact cuts into the wall deformation of the hollow profile. With a trough-shaped recess having oblique walls, sliding against the also oblique wall deformation might occur.

The plug connector according to the invention has retainer catches only on the side webs. They provide lateral guidance and serve as additional pull-out locks. At the connection point of the hollow profile, i.e. usually in the center area of the plug connector, pairs of retainer catches also function as a stop to limit penetration depth when the hollow profiles are slid on. In this connection it is particularly advantageous that the stop has only an occasional function and does not produce spacing of the hollow profile, since it disappears when the second hollow profile is slid on. The center web is configured with flat walls, and preferably has no retainer catches.

In its preferred embodiment, the plug connector according to the invention is configured as a straight connector. As a variation, however, it can also be implemented as a corner angle. It is especially suitable for spacer frames of insulating glass panes. These consist preferably of light alloy hollow profiles which are usually manufactured by extrusion. In addition, however, it is possible to use hollow profiles made from other metals and those manufactured in other ways, for example by rolling. The plug connector or connection according to the invention is not restricted to spacer frames, but can also be extended to other types of and applications for hollow profiles. The subsidiary claims indicate additional advantageous embodiments of the invention. In particular, the plug connectors can have open or closed ends. In the region of the central transverse axis, the plug connector, especially in the embodiment as a straight connector, can also have a depression to receive a sealing compound, a cement, or the like.

BRIEF DESCRIPTION OF THE DRAWINGS

The invention is illustrated schematically in the drawings in the form of examples. The individual drawings show In FIGS. 1A, 1B and 1C, an plug connector with an attached hollow profile, in top view, fragmentary front view, and fragmentary side view, respectively, with portions thereof being cut away to reveal details of internal construction.

DETAILED DESCRIPTION OF THE INVENTION

FIGS. 1 to 4 each illustrate, in top view, front view, and side view, an plug connector 1 which is configured as a straight connector for slid-on hollow profiles (5) of spacer frames for insulating glass panes. As a variation, plug connector (1) can also be implemented as a corner angle.

Figure 1A:
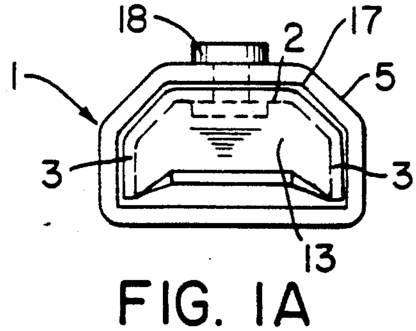
Figure 1B:
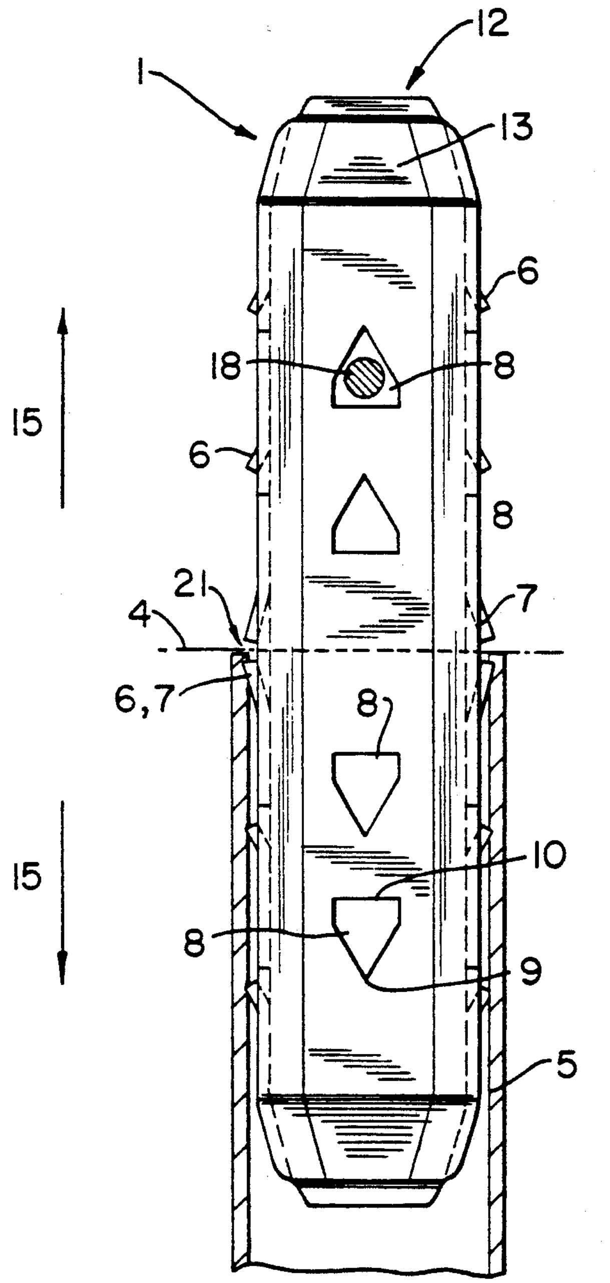
Figure 1C:
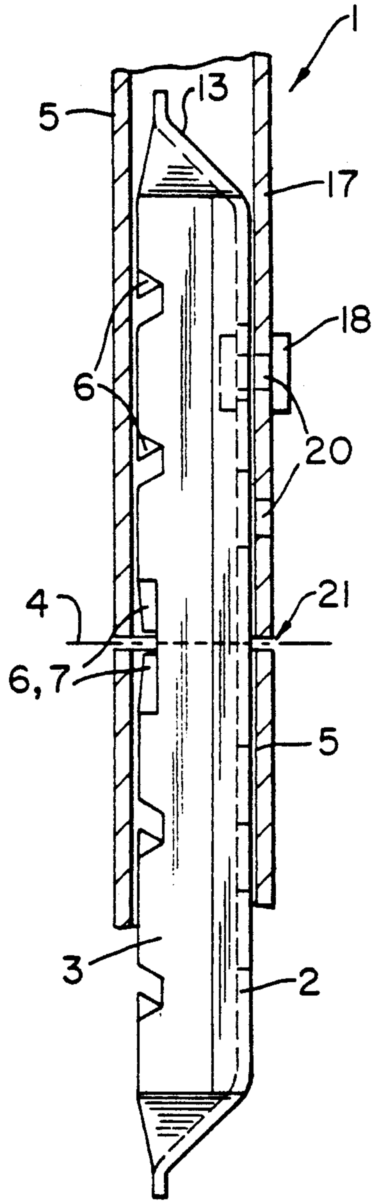

As FIG. 1 makes clear, plug connector (1) has an essentially U-shaped cross section with a center web (2) and bent side webs (3) proceeding therefrom on either side. Plug connector (1) is produced and processed as a thin-walled stamped and bent component made from sheet steel. It has a wall thickness of preferably ca. 0.5 mm.

Its cross section is adapted to the shape of hollow profiles (5), and guided into them. In the exemplary embodiment shown, the roof edges of hollow profile (5) are configured as beveled transitions, with a similar bevel being present between center web (2) and side webs (3) of plug connector (1). Alternatively, however, a different cross-sectional shape—rectangular, prismatic, oval, or the like—can be selected.

Plug connector (1) has at the free edges of the two side webs (3) a plurality of retainer catches (6), bent to the side and, when applicable, also downward. These are stamped out by means of a recess, and in each case point away from the insertion direction (15) of the associated hollow profile (5).

Alternatively, the retainer catches can also be located in the center side web region.

At connection point (21) of the two hollow profiles (5), which is preferably located in the region of the center transverse axis or center (4) of plug connector (1), two elastic retainer catches (6) are located immediately adjacent to one another on each of the two side webs (3), and are raised by means of a shared T-shaped stamped cut. They point in opposite directions, and thus form a stop (7) for hollow profiles (5) slid on from both ends. Plug connector (1) can thus be introduced into hollow profiles (5) with an exact insertion depth, which is advantageous for the positive connection described below.

Retainer catches (6) which function as stop (7) are configured as oblong tongues, and preferably are bent out only laterally. The other eight retainer catches (6) are raised by means of a wider stamped cut, which creates a recess. Retainer catches (6) thus have the shape of sharp corners and are bent out obliquely.

Located in center web (2) of plug connector (1) are four wall perforations (8), which are stamped out as essentially triangular perforations. They are located on longitudinal axis (14) and distributed in pairs, symmetrically with respect to center transverse axis (4). Tips (9) of triangular wall perforations (8) point, in pairs, towards the nearest respective end (12). Each tip (9) thus also points in the insertion direction (15) of the respective hollow profile (5).

Wall perforations (8) do not have a precise triangular shape. Base (10) does not continue directly into the flanks of tip (9), but is slightly set back. As a modification of the embodiment shown, wall perforations (8) can also be provided in different numbers and arrangements. An axially symmetrical distribution with reference to center (4) is, however, recommended. The triangular shape can also be varied, although tip (9) with its orientation should be retained.

In addition to the configuration of plug connector (1), the invention also refers to the plug connection with hollow profiles (5). In order to fasten plug connector (1), not only retainer catches (6) but also a positive connection with the slid-on hollow profiles (5) are provided.

There are a number of possibilities for a positive connection. FIG. 1 shows the first variant with a rivet connection.

Center web (2) contacts top wall (17) of hollow profile (5), in a level manner and preferably over its entire surface. Top wall (17) preferably faces towards the outside of the frame and has a plurality of perforating cutouts (20) which are distributed and placed to correspond with wall perforations (8) in plug connector (1). When plug connector (1) is inserted in hollow profile (5) and contacts its end wall with stop (7), wall perforations (8) and cutouts (20) in top wall (17) are in alignment with one another.

When the second hollow profile (5) is slid on, elastic retainer catches (6) which function as stop (7) are bent back and disappear into hollow profile (5). The two hollow profiles (5) thus butt tightly and essentially without a gap against one another at connection point (21); in addition, cutouts (20) on both are precisely positioned with respect to wall perforations (8) in the plug connector. Hollow profiles (5) can be slid onto the plug connector in succession or simultaneously.

After one or both hollow profiles (5) have been joined with plug connector (1), rivets (18) are inserted through wall perforations (8, 20) and tightened. Rivets (18) shape themselves at least partially into tips (9) of wall perforations (8). Tips (9) also produce a wedging effect that pulls and braces hollow profiles (5) towards connection point (21). This effect also has a stabilizing effect against a pulling-out load of plug connector (1).

Figure 2A:
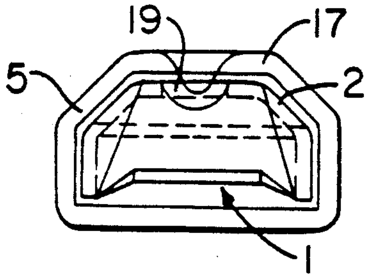
In FIGS. 2A, 2B and 2C, an plug connector as a variation of FIG. 1 with a depression; and In FIGS. 3A, 3B and 3C and FIGS. 4A, 4B and 4C, plug connectors as variations of FIGS. 1 and 2, with open ends.
Figure 2B:
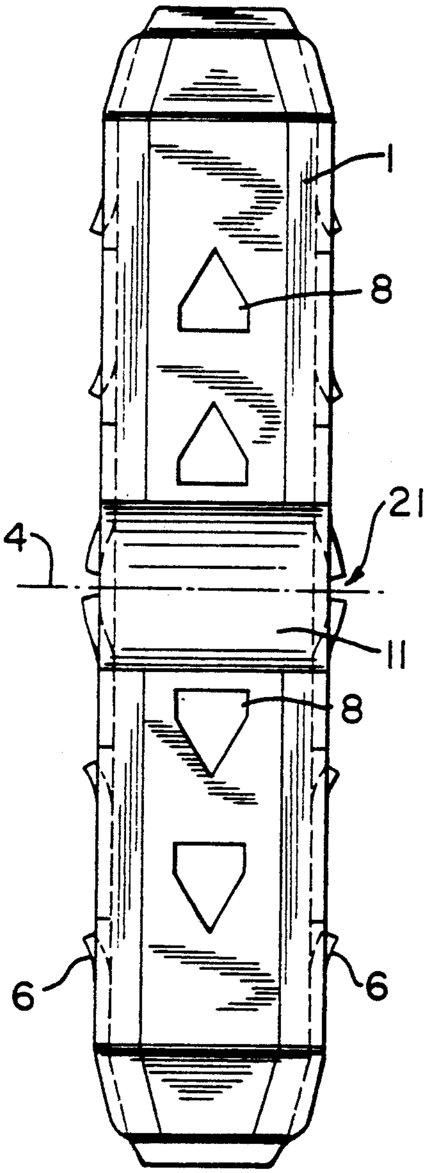
Figure 2C:
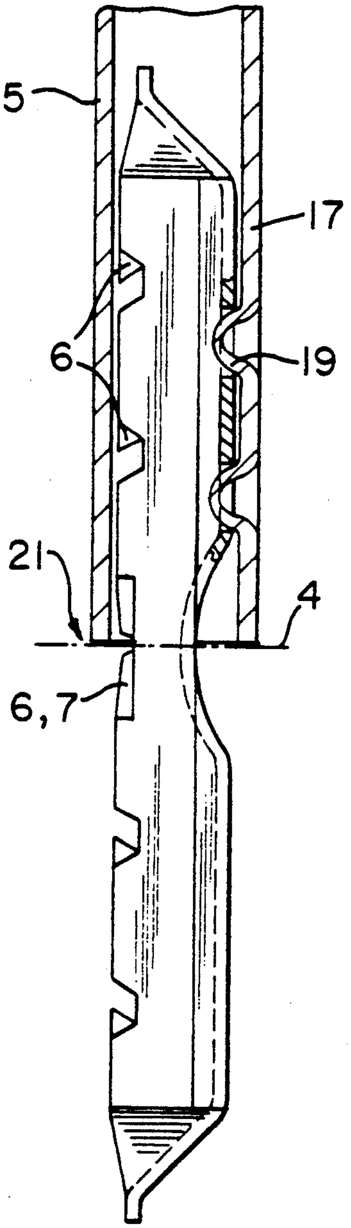

FIG. 2 shows the second variant of positive connection. In this case, instead of rivets (18), a wall deformation (19) engages positively into and through wall perforations (8). It is also preferably located on the outside of the frame. Wall deformation (19) is created by pressing with corresponding dies (not shown), which press top wall (17) downward and plastically deform it. Here again, stops (7) produce, in the manner described above, precise positioning of plug connector (1) in hollow profiles (5), and therefore also an accurate correlation between wall perforations (8) and the aforesaid dies.

Wall deformations (19) are preferably pressed through on the entire surface of wall perforations (8) with the die preferably being round in cross section. Wall deformation (19) contacts the edges of wall perforations (8) over its entire circumference, which ensures secure positive engagement. Wall perforations (8) are punched out with a straight cut, and have thin, vertical edges. They are surrounded tightly by wall deformation (19).

FIG. 2 also shows a variation in the configuration of plug connector (1), which otherwise corresponds to the embodiment shown in FIG. 1. A transverse depression (11) is provided in the region of center (4). This depression is created during manufacture by stamping and depressing the center web.

Depression (11) is located at connection point (21) of slid-on hollow profiles (5), and receives a sealing compound, a cement, or the like (not shown). Wall perforations (8) continue at each end from depression (11) with a certain spacing.

In the exemplary embodiment of FIGS. 1 and 2, plug connector (1) is closed at the ends. For this purpose, center web (2) is bent down at both ends forming an oblique end cover (13). Straight plug connector (1) in this embodiment is preferably mounted in hollow profiles (5) so that its center web (2) faces towards the outside of the spacer frame. Cavity (16) located in U-shaped plug connector (1) then faces the inside of the frame, and therefore the inner surface of the insulating glass pane. The spacer frame and plug connector (1) are filled with a desiccant, preferably in granulated form, which therefore also communicates with the interior of the insulating glass pane in the region of plug connector (1) via holes in the hollow profile wall.

Figure 3A:
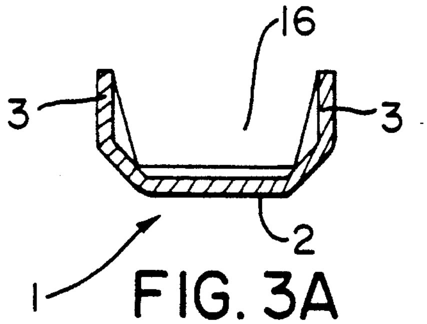
Figure 3B:
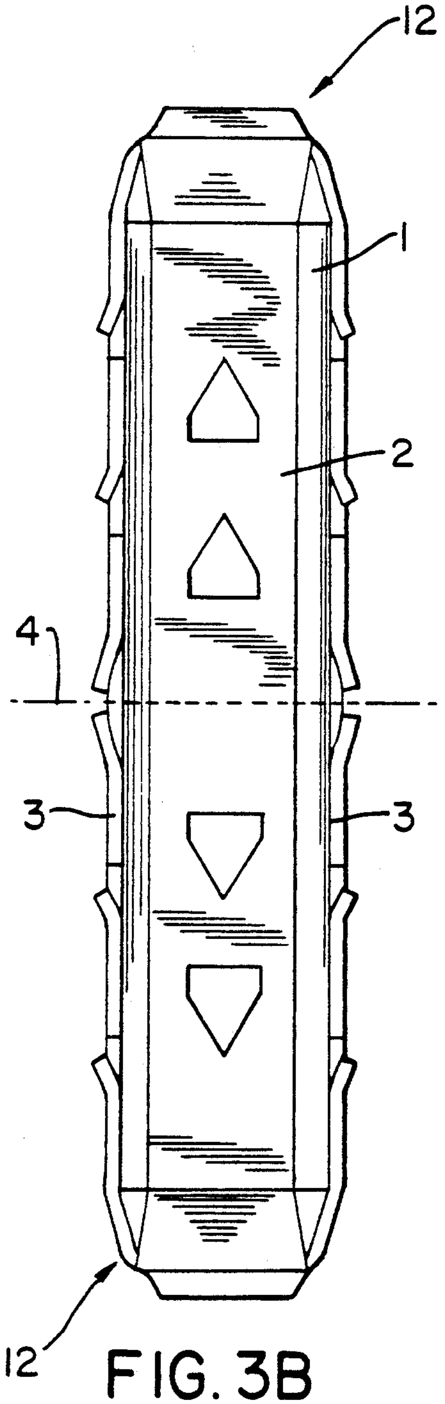
Figure 3C:
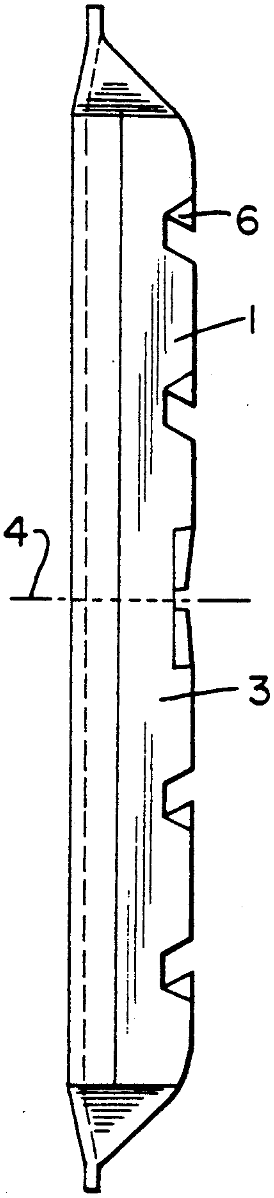
Figure 4A:
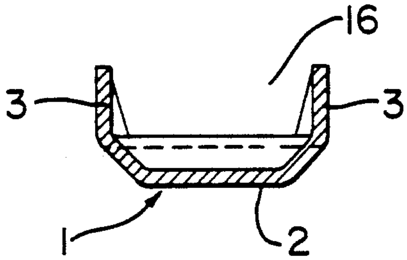
Figure 4B:
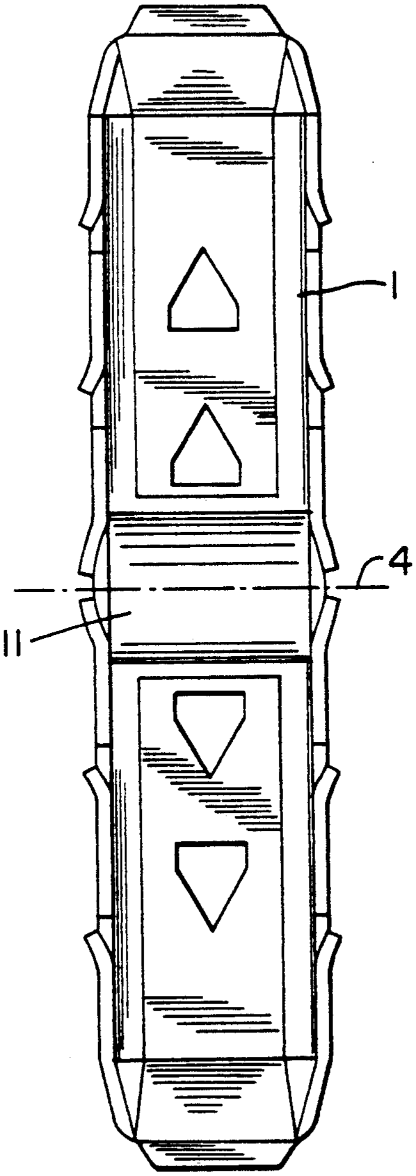
Figure 4C:
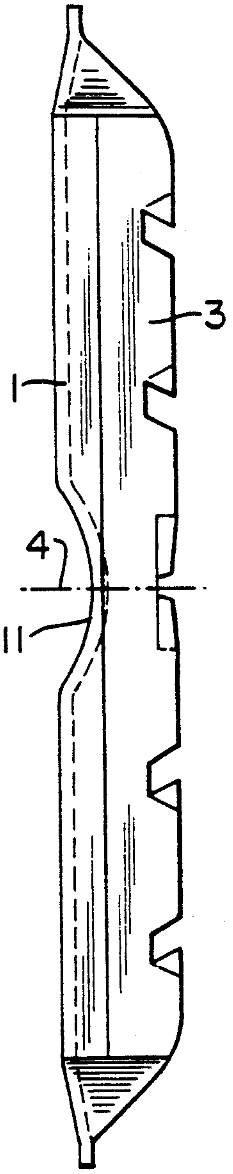

FIGS. 3 and 4 show a modified plug connector (1) that is open at the ends. Otherwise plug connectors (1) correspond to the embodiments in FIGS. 1 and 2. In FIGS. 3 and 4, center web (2) is only slightly depressed, and thereby creates a pass-through opening at the end. Cavity (16) of plug connector (1) is thus entirely continuous axially. This allows the desiccant to flow through, and makes it possible to fill the spacer frame after plug connectors (1) have been installed.

In this embodiment, plug connector (1) can preferably be installed in hollow profiles (5) in such a way that its center web (2) faces the inside of the frame and the inner region of the insulating glass pane.

I claim:

1. A plug connector for making a connection joint between an axially aligned pair of hollow spacer profiles of insulating glass panes, said plug connector defining a longitudinal axis and a center transverse axis transverse thereto and being configured as an essentially box-type cross section with a center web and a pair of side webs extending from said center web, with a plurality of essentially triangular openings being located in said center web on both sides of the center transverse axis, each of said openings defining an apex pointing to the nearest end of said plug connector, said plug connector further being configured as a stamped and bent component made from sheet steel with an essentially U-shaped cross section, with said openings in said center web being configured as wall perforations fully circumscribed by said center web, and with said side webs having a plurality of bent-out elastic retainer catches, two of said elastic retainer catches being located immediately adjacent to one another on each said web side in the region of a profile connection joint and pointing in opposite directions to form a stop for one of the profiles.

2. Plug connection according to claim 1, characterized in that said retainer catches are located at the free edges of said side webs and are bent outward at least laterally.

3. Plug connector according to claim 1, characterized in that said center web has four wall perforations, which are located in pairs and symmetrically with respect to the center transverse axis.

4. Plug connector according to claim 1, characterized in that said center web has a transverse depression in the region of the center transverse axis.

5. Plug connector according to claim 1, characterized in that said plug connector has ends open at both ends and an axially continuous cavity.

6. Plug connector according to claim 1 characterized in that said plug connector has ends and end covers at both ends.

* * * * *